United States Patent

Malmberg et al.

(10) Patent No.: US 6,701,860 B2
(45) Date of Patent: Mar. 9, 2004

(54) FENDER

(75) Inventors: Mats Anders Malmberg, Rydsgård (SE); Lars Göran Mikael Grönvall, Trelleborg (SE)

(73) Assignee: Metso Minerals (Trelleborg) AB, Trelleborg (SE)

( * ) Notice: Subject to any disclaimer, the term of this patent is extended or adjusted under 35 U.S.C. 154(b) by 0 days.

(21) Appl. No.: 10/259,185

(22) Filed: Sep. 27, 2002

(65) Prior Publication Data

US 2003/0061977 A1 Apr. 3, 2003

Related U.S. Application Data (60) Provisional application No. 60/327,438, filed on Oct. 5, 2001.

(30) Foreign Application Priority Data

Oct. 1, 2001 (SE) .............................................. 0103260

(51) Int. Cl.⁷ .............................................. B63B 59/02
(52) U.S. Cl. ........................ 114/219; 267/139; 405/215
(58) Field of Search ........................ 114/219; 267/139, 267/140, 141, 153; 405/212, 215

(56) References Cited

U.S. PATENT DOCUMENTS

| | | | | |
|---|---|---|---|---|
| 3,118,659 A | * | 1/1964 | Paulsen ...................... | 267/153 |
| 3,600,896 A | * | 8/1971 | Tateisi et al. ............... | 405/215 |
| 3,948,500 A |   | 4/1976 | Korbuly et al. ............. | 267/140 |
| 3,999,497 A |   | 12/1976 | Hamel ....................... | 114/219 |
| 4,258,641 A |   | 3/1981 | Wakamiya .................. | 114/219 |
| 4,267,792 A | * | 5/1981 | Kimura et al. .............. | 114/219 |
| 4,285,616 A | * | 8/1981 | Evetts ........................ | 405/215 |
| 4,355,792 A | * | 10/1982 | Fukuda et al. .............. | 267/153 |
| 4,545,316 A | * | 10/1985 | Yamaguchi et al. ........ | 114/219 |
| 4,601,611 A | * | 7/1986 | Tagomori et al. ........... | 405/215 |
| 4,756,266 A | * | 7/1988 | Sakuraoka .................. | 114/219 |
| 5,054,414 A | * | 10/1991 | Yamaguchi ................. | 114/219 |
| 5,127,354 A | * | 7/1992 | Magrab et al. ............. | 114/219 |
| 5,458,077 A |   | 10/1995 | Enami et al. ............... | 114/219 |
| 5,957,073 A | * | 9/1999 | Kerber et al. .............. | 114/219 |
| 5,975,000 A | * | 11/1999 | Nakamura .................. | 114/219 |
| 6,357,377 B1 | * | 3/2002 | Santelli, Jr. ................. | 114/219 |

FOREIGN PATENT DOCUMENTS

| | | |
|---|---|---|
| DE | 9101735 | 6/1991 |
| EP | 0135997 | 4/1985 |
| EP | 0812961 | 12/1997 |

* cited by examiner

*Primary Examiner*—S. Joseph Morano
*Assistant Examiner*—Lars A. Olson
(74) *Attorney, Agent, or Firm*—Kinney & Lange, P.A.

(57) ABSTRACT

A fender (1) has a fastening end (2) and a shock-absorbing end (3) and, arranged therebetween, at least one deformation portion (4). The deformation portion (4) is made of an elastically deformable material, especially elastomeric material, and is arranged to fold during deformation of the fender (1), so that surface portions of the deformation portion (4) are folded towards each other. The deformation portion (4) has on at least one surface projections (5) and recesses (6) of such a shape and location that they can engage with each other in a comblike manner when said surface portions of the deformation portion (4) are folded towards each other during deformation of the fender (1).

13 Claims, 7 Drawing Sheets

FENDER

FIELD OF THE INVENTION

The present invention relates to a fender with a fastening end and a shock-absorbing end and, arranged therebetween, at least one deformation portion which is made of an elastically deformable material, especially elastomeric material, and which is arranged, during deformation of the fender, to fold so that surface portions of the deformation portion are folded towards each other.

BACKGROUND ART

Fenders of the type described by way of introduction are used on quays, oil rigs and the like.

Such fenders are known from U.S. Pat. No. 5,458,077 which describes fenders of different types, which on their inside are provided with thickenings in order to improve the rigidity of the fender.

The fender described in EP 812 961 has similarly been provided with thickenings on its outside or on the inside as well as on the outside.

U.S. Pat. No. 3,999,497 discloses a cylindrical fender which on the outside of one end has a tubular rubber element. This rubber element prevents, when subjecting the fender to loads, the fender from suddenly losing its rigidity.

EP 135 997 describes a fender which in the outer surface close to its one end is provided with a fold line (slot) to control the deformation of the fender when subjected to loads. As a result, the fender will have a shorter collapsing length and, thus, improved stability.

A drawback of the above-mentioned fenders is that they have unsatisfactory stability when subjected to oblique loads. This is a problem since ships, when berthing, to a great extent strike against the fenders at an oblique angle, which means that the shock-absorbing end of the fender is laterally displaced relative to the fender fastening end which is fixedly secured, for instance, to a quayside.

According to U.S. Pat. No. 3,948,500, attempts have been made to solve this problem by means of a frustoconical fender with improved lateral stability. However, this fender has very thick walls, which makes the consumption of material great.

SUMMARY OF THE INVENTION

The object of the present invention is to provide a fender which is improved over prior-art technique.

A special object of the invention is to provide a fender with improved deformation properties when subjected to uneven loads.

One more object of the invention is to provide a strong fender with a reduced consumption of material.

According to the invention, these objects are achieved by the fender of the type described by way of introduction being given the features that are evident from claim 1. Preferred embodiments are defined in the dependent claims.

The inventive fender utilizes a deformation portion which on at least one surface is provided with projections and recesses having such a shape and location that they can engage with each other in a comblike manner during deformation of the fender. As the fender is being deformed, the projections engage in the recesses and provide locking of the fender. Thus, the fender cannot be deformed in the lateral direction and will have improved stability when subjected to oblique loads and shearing load.

According to an embodiment of the invention, the projections and recesses are located on an outwardly directed surface portion of the deformation portion. The projections and recesses may instead be positioned on an inwardly directed surface portion of the deformation portion, or on both an inwardly directed and an outwardly directed surface portion of the deformation portion.

According to an embodiment of the invention, the deformation portion of the fender has first and second conical hollow portions, whose narrow ends are joined with each other, and the projections are arranged with interspaces forming the recesses, the first and second conical portions being arranged relative to each other in such manner that the projections on one frustoconical portion engage in the recesses on the other frustoconical portion. This design makes it possible to provide the desired locking in a simple and safe manner, while at the same time the manufacture of the fender can be made very rational.

In an embodiment of the inventive fender, the first conical portion is made of a material with essentially higher hardness than the second conical portion. This gives the possibility of controlling the deformation of the fender when subjected to loads. The softer conical portion is then pressed together before deformation of the harder conical portion begins.

According to another embodiment, the fender is designed as at least two parallelepipedal fender legs. This is an alternative way of making a strong fender according to the invention.

The parallelepipedal fender legs advantageously have V-shaped projections. During deformation of the fender, the V-shaped projection will engage in the recess between the legs of the V, which ensures a good stabilizing locking.

The deformation portion of the tender is preferably made of an elastomeric material, which gives the fender the desired stability and flexibility.

BRIEF DESCRIPTION OF THE DRAWINGS

The invention will now be described in more detail by way of embodiments and with reference to the accompanying drawings.

DESCRIPTION OF PREFERRED EMBODIMENTS

Figure 1:
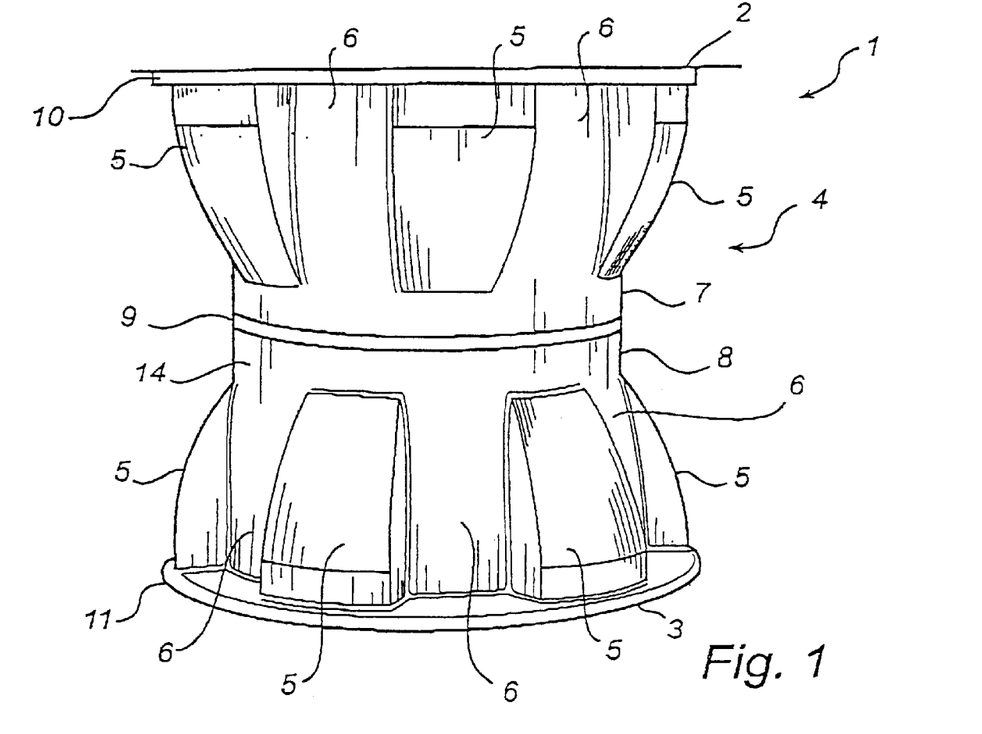
FIG. 1 is a perspective front view and shows a first embodiment of the fender according to the invention.

The fender 1 shown in FIG. 1 has a fastening end 2 and a shock-absorbing end 3. A deformation portion 4 extends between the ends 2, 3. The deformation portion 4 has a plurality of projections 5 and, arranged therebetween, recesses 6. The deformation portion 2 consists of a first, in the Figure upper, frustoconical hollow portion 7 and a second, in the Figure lower, frustoconical hollow portion 8. At their narrow ends, the conical portions 7, 8 can be interconnected by means of a connecting ring 9 or be glued or molded together. At its wide end, the first conical portion 7 connects to a mounting flange 10. The second conical portion 8 connects correspondingly to a mounting flange 11.

The conical portions 7, 8 are molded in polyurethane. Also other elastomeric materials can be used. Identical molds can be used for the first and for the second frustoconical portion 7, 8, which makes manufacture rational. The mounting flanges 10, 11 are molded together with the respective conical portions 7, 8. The mounting flanges 10, 11 can also be made with an integrated metal ring. When assembling the fender 1, the two conical portions 7, 8 are arranged rotated relative to each other, so that the projections 5 of the first conical portion 7 will be positioned just in front of the recesses 6 of the second conical portion 8 and vice versa. The first conical portion 7 is made of a softer material (about 70 Shore A) than the second conical portion 8 (about 78 Shore A). The materials can also be selected in reverse order or with the same hardness. If different degrees of hardness are selected, the deformation of the fender can be controlled, so that the softer portion is first pressed together before the deformation of the harder portion begins.

Figure 7:
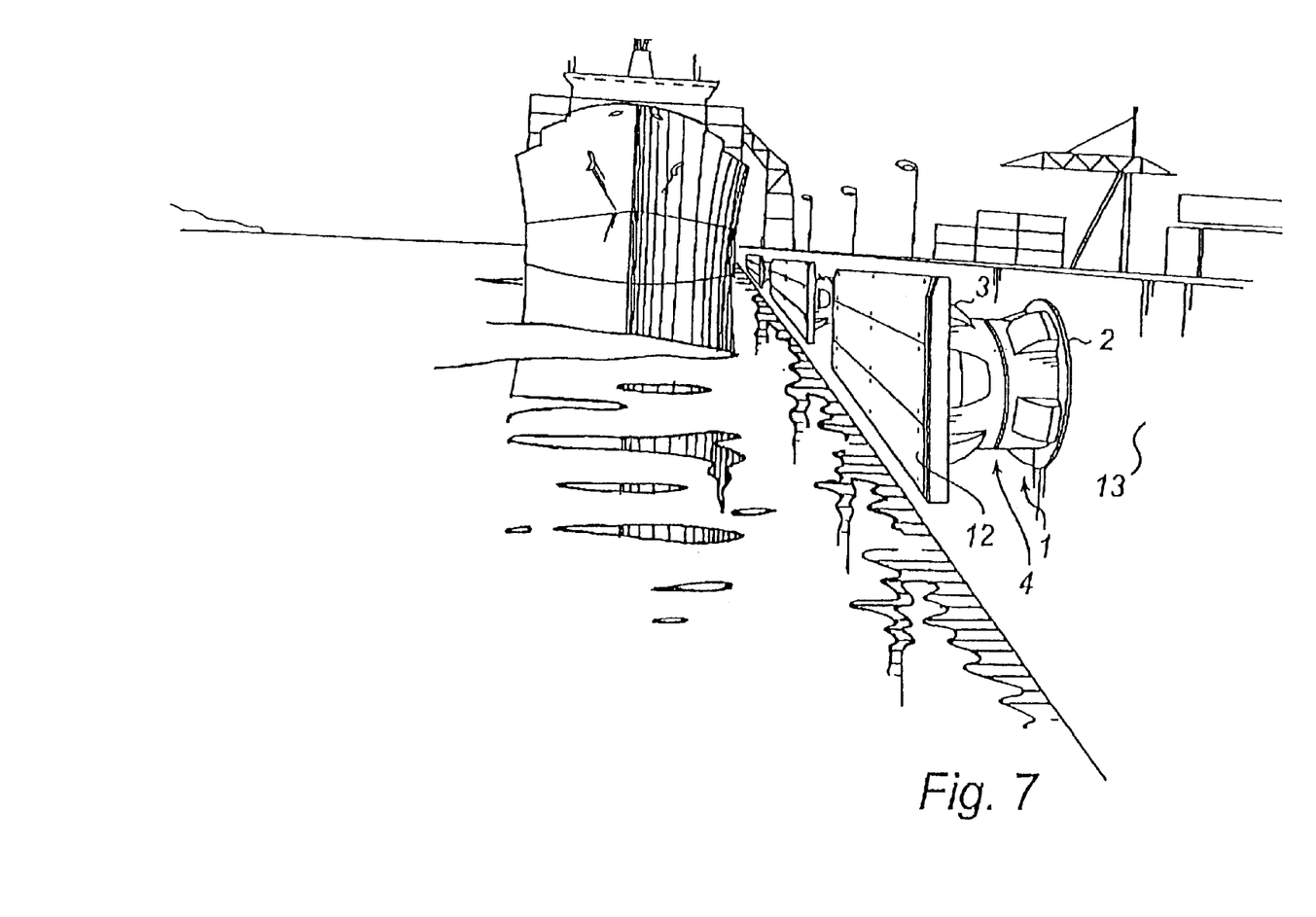
FIG. 7 is a perspective view and shows fenders such as the one in FIG. 1 mounted at a quayside.

The fender 1 is mounted as shown in FIG. 7 at a quayside 13. The shock-absorbing end 3 is screwed, by means of the mounting flange 10 of the first conical portion 7, to a fender shield 12, and the fender 1 with the fender shield 12 is screwed with its fastening end 2, by means of the mounting flange 11 of the second conical portion 8, to the quayside 13.

Figure 2:
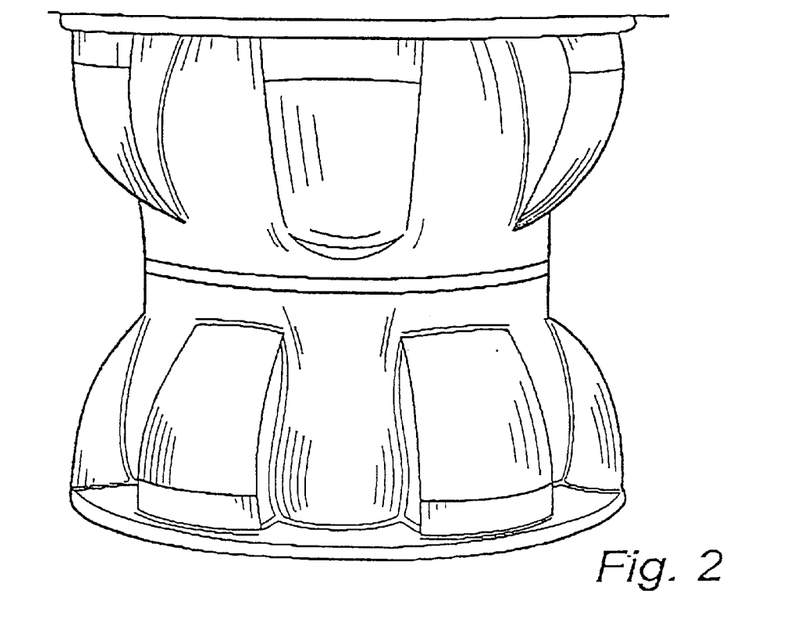
FIG. 2 shows the fender in FIG. 1 in a first compressed state.
Figure 3:
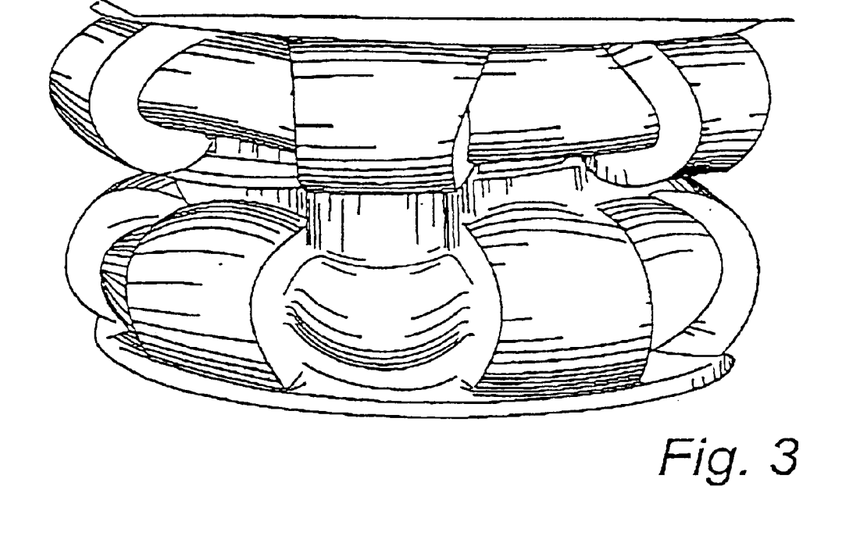
FIG. 3 shows the fender in FIG. 1 in a second compressed state.
Figure 4:
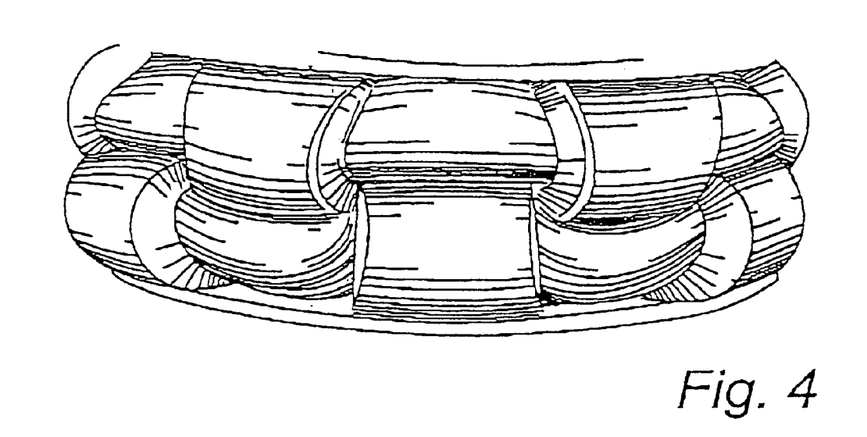
FIG. 4 shows the fender in FIG. 1 in a third compressed state.
Figure 5:
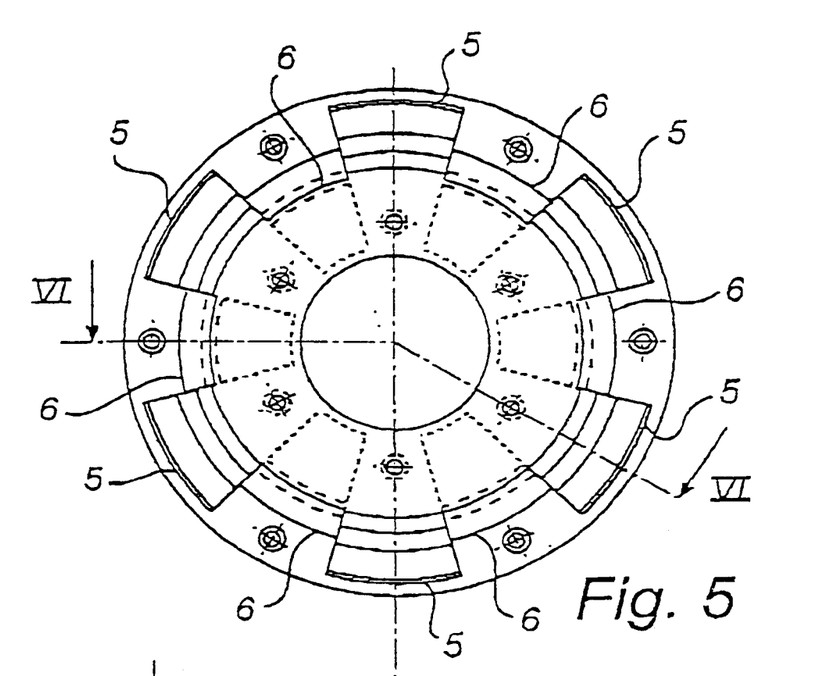
FIG. 5 is a plan view and shows a frustoconical portion of the fender in FIG. 1 seen from above.

When the fender 1 via the fender shield 12 is subjected to loads exerted by a ship berthing at the quayside 13, the fender 1 is pressed together, as shown in FIGS. 2–4. Surface portions of the deformation portion are then folded towards each other. FIG. 4 shows how surface portions at the shock-absorbing end 3 of the fender 1 abut against surface portions at the fastening end 2 when the fender 1 has been greatly deformed. Also when subjected to oblique loads, which occurs frequently at quaysides, the fender has good stability since the projections 5 engage in the recesses 6 and provide locking. Therefore the fender 1 is deformed only insignificantly in the lateral direction.

The design of the fender 1 causes the forces exerted thereon to be centered in the center of the fender 1. Moreover, a longer spring length will be obtained, which results in a strong fender 1 with a reduced consumption of material.

Figure 6:
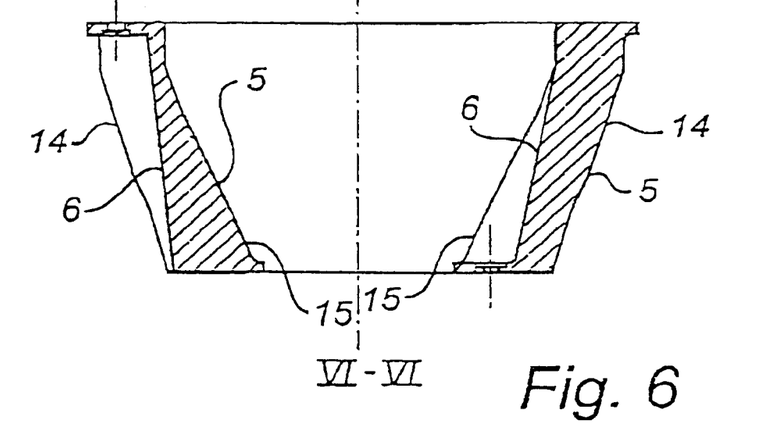
FIG. 6 is a sectional view and shows a section along line VI—VI in FIG. 5.

As is evident from FIG. 6, the fender 1 has projections and recesses both on the outwardly directed surface 14 and on the inwardly directed surface 15. Other embodiments are also feasible. For instance, the fender may have a smooth inwardly directed surface 15 and projections and recesses on the outwardly directed surface 14 only. A fender can also be made up of two frustoconical portions which are interconnected at their wide ends. The inwardly directed surface 15 of the fender can then be provided with projections and recesses whereas the outwardly directed surface 14 remains smooth.

Figure 8:
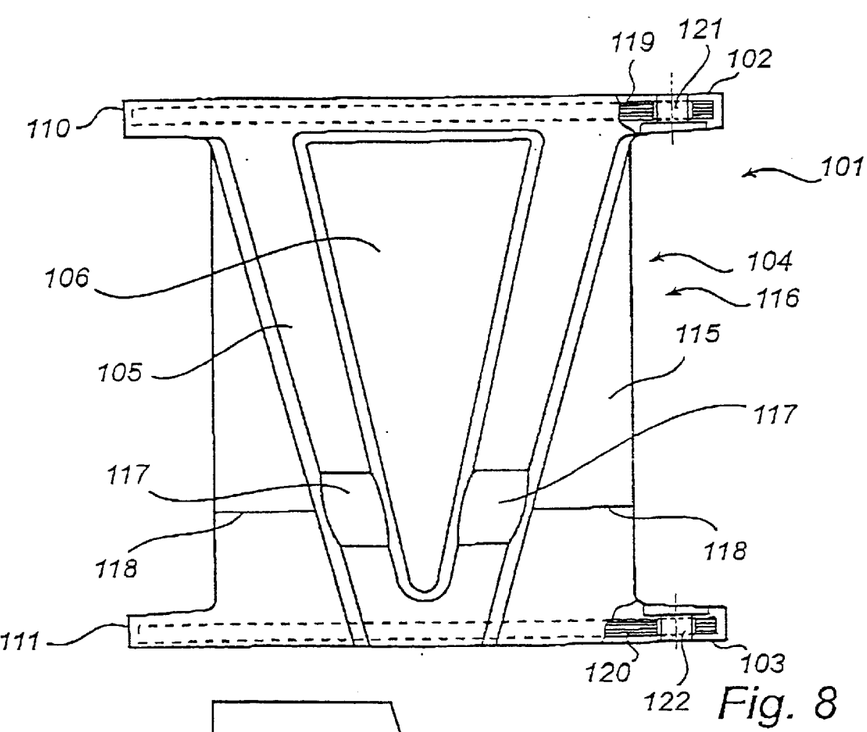
FIG. 8 is a front plan view and shows a second embodiment of the fender according to the invention.
Figure 9:
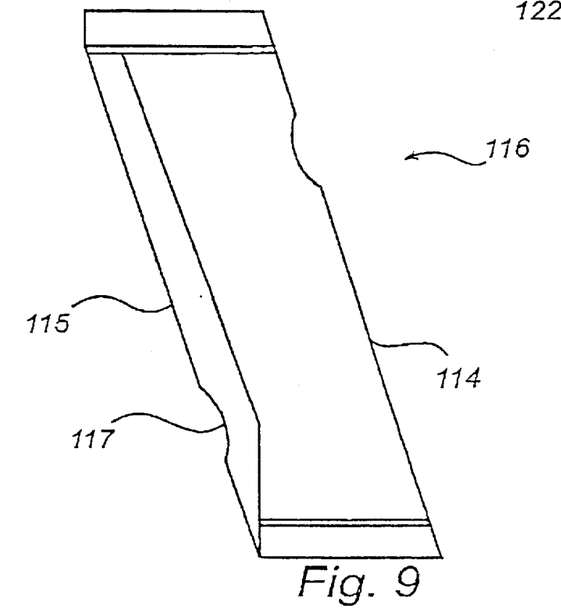
FIG. 9 is a side plan view and shows a leg of the fender in FIG. 6.

A fender 101 according to another embodiment of the invention is shown in FIG. 8. This fender 101 is formed with two parallelepipedal supporting legs 106, of which one is shown in FIG. 9. The fender 101 can also be formed with more than two fender legs 116. The fender 101 has a fastening end 102 and a shock-absorbing end 103 and, arranged therebetween, a deformation portion 104 with a v-shaped projection 105. A recess 106 is formed between the legs of the projection 105. In each leg, close to the tip of the V, the projection 105 is formed with a recess 117. In the surfaces outside the projection 105, the deformation portion 104 has a fold line 118 level with the recesses 117. At the end which is the upper end in the Figure, the fender 101 has a mounting flange 110 in which a metal plate 119 is positioned. Screw holes 121 for mounting of the fender 101 extend through the outer ends of the flange 110 and the metal plate 119. Correspondingly, there is at the end which in the Figure is the lower end a mounting flange 111 with a metal plate 120 and screw holes 122.

The fender 101 is molded in urethane rubber, but also other elastomeric materials can be used. During molding, the metal plates 119, 120 are molded into the mounting flanges 110, 111. Then the flanges 110, 111 are formed with the screw holes 121, 122.

Figure 10:
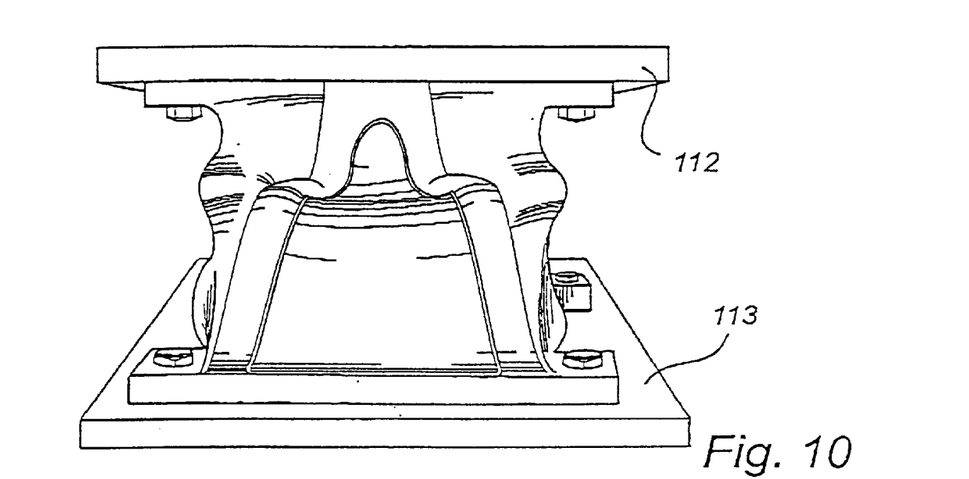
FIG. 10 is a perspective front view and shows the fender in FIG. 6 in a first compressed stats.
Figure 11:
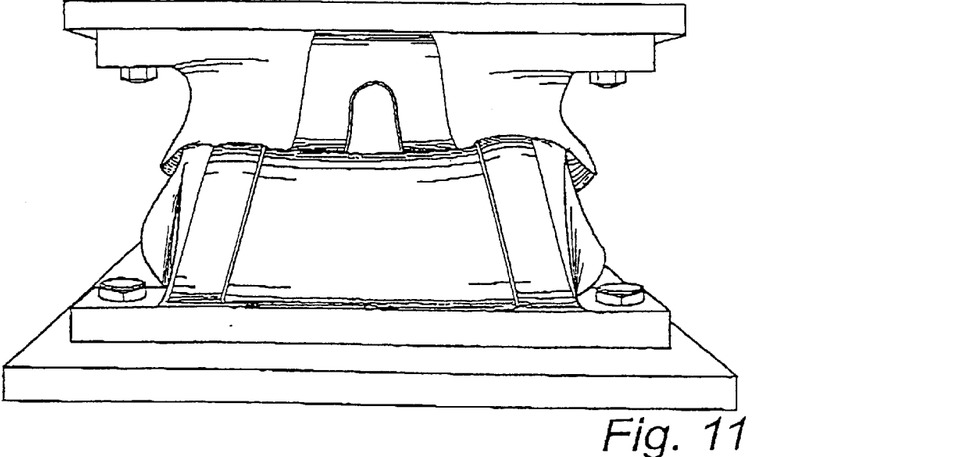
FIG. 11 shows the tender in FIG. 6 in a second compressed state.
Figure 12:
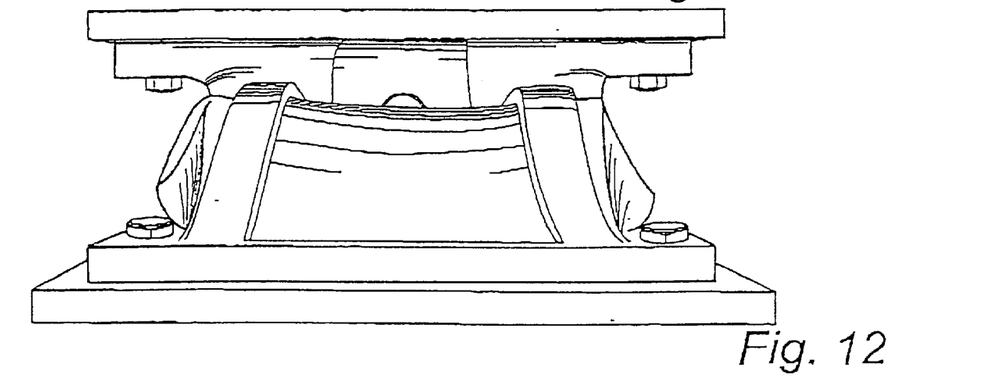
FIG. 12 shows the fender in FIG. 6 in a third compressed state.
Figure 13:
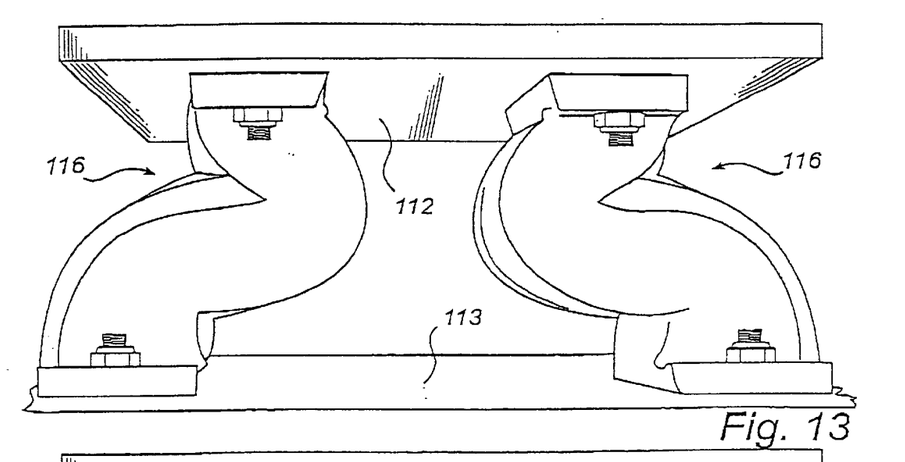
FIG. 13 is a perspective side view and shows two cooperating fender legs according to FIG. 7 in a first compressed state.
Figure 14:
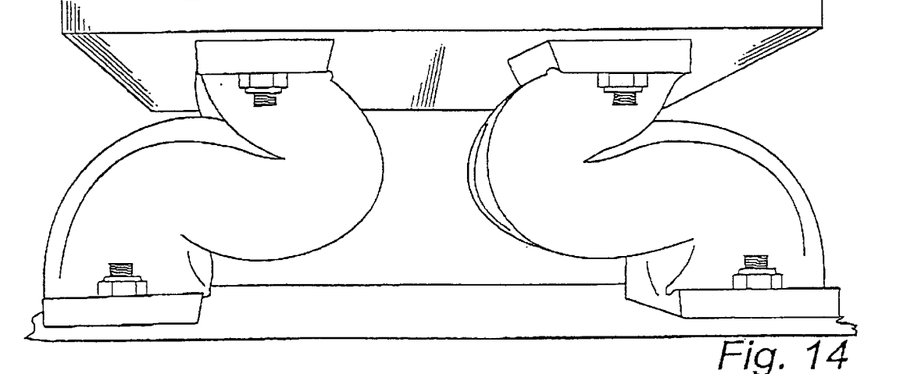
FIG. 14 is a perspective side view and shows two cooperating fender legs according to FIG. 7 in a second compressed state.
Figure 15:
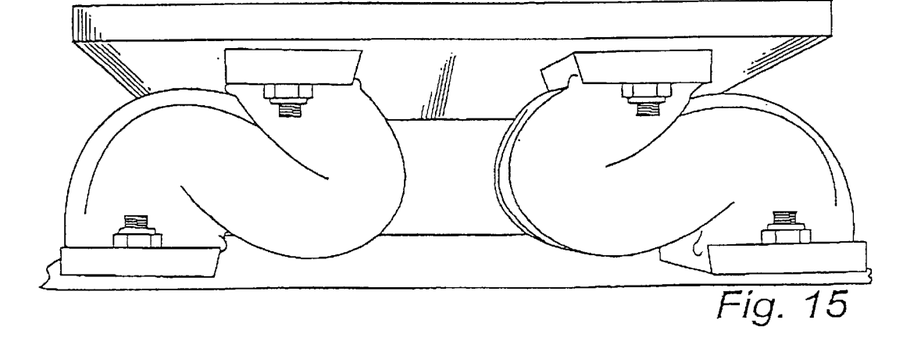
FIG. 15 is a perspective side view and shows two cooperating fender legs according to FIG. 7 in a third compressed state.

The fender 101 is mounted in the same way as the fender 1 described in connection with FIG. 1, with a fender shield 112 at a quayside 113. As shown in FIG. 9, the fender legs 116 can be mounted with the projection 105 and the recess 106 on a inwardly directed surface 115 or, as shown in FIGS. 10–12, with the projection 105 and the recess 106 on an outwardly directed surface 114. It is also possible to form fender legs 116 with projections 105 and recesses 106 on both the inwardly directed and outwardly directed surface.

When the fender 101 is subjected to loads exerted by a ship berthing at the quayside, it is pressed together as shown in FIGS. 10–15. Like in the fender 1 shown in FIG. 1, surface portions of the fender are folded towards each other as the fender is being deformed. The cooperation of the V-shaped projection 105 with the recess 106 between the legs of the V provides locking of the fender 101. Therefore the fender 101 maintains good stability also when subjected to oblique loads.

The recess 117 and the fold line 118 act as fold indication during deformation of the fender 101. The fender 101 can also be formed without the recess 117 and the fold line 118, as is evident from FIG. 10.

Owing to its design, the fender 101 will have an increased spring length, which allows material to be saved, with maintained stability.

In the embodiments described above, urethane rubber and molding have been used in manufacture. Also other types of elastomeric materials, however, may be used, and as is known to those skilled in the art, the manufacturing method has be adapted to the selected type of elastomeric material. If, for example, mixtures of natural rubber (NR) and/or styrene butadiene rubber (SBR) are used, which is preferred for fender legs according to FIGS. 8 and 9, manufacture takes place in the traditional manner by the rubber material being supplied to curing molds and cured in these.

What we claim and desire to secure by Letters Patent is:

1. A fender with a fastening end and a shock-absorbing end and, arranged therebetween, at least one deformation portion which is made of an elastically deformable material; which is arranged to fold, during deformation of the fender, so that surface portions of the deformation portion are folded towards each other, characterized in that opposing surface portions have projections and recesses of such a shape and location that they can engage with each other in a guiding and interlocking manner when said surface portions of the deformation portion are folded towards each other during deformation of the fender.

2. A fender as claimed in claim 1, in which the projections and the recesses are located on an outwardly directed surface of the deformation portion.

3. A fender as claimed in claim 1, in which the projections and the recesses are located on an inwardly directed surface of the deformation portion.

4. A fender as claimed in claim 1, in which the projections and the recesses are located both on an inwardly directed surface and on an outwardly directed surface of the deformation portion.

5. A fender as claimed in claim 1, in which the deformation portion has first and second frustoconical hollow portions, whose narrow ends are joined with each other, and in which the projections are arranged with interspaces forming the recesses, the first and second conical portions being arranged relative to each other in such a manner that the projections on one frustoconical portion have the possibility of engaging in the recesses of the other frustoconical portion during deformation of the fender.

6. A fender as claimed in claim 5, wherein the first frustoconical portion is made of a material with an essentially higher hardness than the second frustoconical portion.

7. A fender as claimed in claim 1, which has at least two parallelepipedal fender legs.

8. A fender as claimed in claim 7, in which the projections are V-shaped.

9. A fender as claimed in claim 1, in which at least the deformation portion is made of an elastomeric material.

10. A fender with a fastening end and a shock-absorbing end and, arranged therebetween, at least one deformation portion which is made of an elastically deformable material which is arranged to fold, during deformation of the fender, so that surface portions of the deformation portion are folded towards each other, characterized in that opposing surface portions have projections and recesses of such a shape and location that they can engage with each other in a guiding and interlocking manner when said surface portions of the deformation portion are folded towards each other during deformation of the fender, and further characterized in that the deformation portion has first and second frustoconical hollow portions, whose narrow ends are joined with each other, and in which the projections are arranged with interspaces forming the recesses, the first and second conical portions being arranged relative to each other in such a manner that the projections on one frustoconical portion have the possibility of engaging in the recesses of the other frustoconical portion during deformation of the fender.

11. A fender as claimed in claim 10, wherein the first frustoconical portion is made of a material with an essentially higher hardness than the second frustoconical portion.

12. A fender with a fastening end and a shock-absorbing end and, arranged therebetween, at least one deformation portion which is made of an elastically deformable material and which is arranged to fold, during deformation of the fender, so that surface portions of the deformation portion are folded towards each other, characterized in that the fender has at least two parallelepipedal fender legs and opposing surface portions have projections and recesses of such a shape and location that they can engage with each other in a guiding and interlocking manner when said surface portions of the deformation portion are folded towards each other during deformation of the fender.

13. A fender as claimed in claim 12, in which the projections are V-shaped.

* * * * *

UNITED STATES PATENT AND TRADEMARK OFFICE
CERTIFICATE OF CORRECTION

PATENT NO.    : 6,701,860 B2
DATED         : March 9, 2004
INVENTOR(S)   : Mats Anders Malmberg et al.

It is certified that error appears in the above-identified patent and that said Letters Patent is hereby corrected as shown below:

<u>Column 2,</u>
Line 63, delete "stats" insert -- state --
Line 64, delete "tender" insert -- fender --

<u>Column 5,</u>
Line 6, delete "material:" insert -- material --

Signed and Sealed this

Twenty-eighth Day of September, 2004

JON W. DUDAS
*Director of the United States Patent and Trademark Office*